United States Patent
Schirado

(10) Patent No.: US 9,670,652 B2
(45) Date of Patent: Jun. 6, 2017

(54) REMOTELY CONTROLLED HYDRANT SYSTEM

(71) Applicant: Schirado Inventions, LLC, Glen Ullin, ND (US)

(72) Inventor: Richard M. Schirado, Glen Ullin, ND (US)

(73) Assignee: Schirado Inventions, LLC, Glen Ullin, ND (US)

(*) Notice: Subject to any disclaimer, the term of this patent is extended or adjusted under 35 U.S.C. 154(b) by 0 days.

(21) Appl. No.: 15/042,413

(22) Filed: Feb. 12, 2016

(65) Prior Publication Data

US 2016/0237660 A1    Aug. 18, 2016

Related U.S. Application Data

(60) Provisional application No. 62/115,271, filed on Feb. 12, 2015.

(51) Int. Cl.
| | |
|---|---|
| *E03B 9/02* | (2006.01) |
| *E03B 9/04* | (2006.01) |
| *A01G 25/16* | (2006.01) |
| *H02S 40/38* | (2014.01) |

(52) U.S. Cl.
CPC ............ *E03B 9/04* (2013.01); *A01G 25/165* (2013.01); *H02S 40/38* (2014.12)

(58) Field of Classification Search
CPC ........ E03B 9/02; E03B 9/04; Y10T 137/5438; B05B 12/02
USPC .............. 137/291, 292, 294, 624.11, 624.12, 137/624.13; 251/129.01, 129.18, 129.2
See application file for complete search history.

(56) References Cited

U.S. PATENT DOCUMENTS

| | | | | | |
|---|---|---|---|---|---|
| 3,650,471 | A | * | 3/1972 | Sutton ................. | A62C 35/605 137/272 |
| 4,561,459 | A | * | 12/1985 | Jackman ................ | E03B 9/04 137/291 |
| 4,617,956 | A | * | 10/1986 | Sievers ................. | E03B 9/08 137/272 |
| 4,989,830 | A | * | 2/1991 | Ratnik .................. | E03B 9/02 251/129.11 |
| 5,547,164 | A | * | 8/1996 | Ratnik .................. | E03B 9/02 251/129.03 |
| 5,749,517 | A | | 5/1998 | Dupre | |
| 7,434,781 | B2 | | 10/2008 | Taylor | |
| 8,733,390 | B2 | * | 5/2014 | McKeague ............. | E03B 7/006 137/296 |

(Continued)

*Primary Examiner* — Reinaldo Sanchez-Medina
(74) *Attorney, Agent, or Firm* — Neustel Law Offices

(57) ABSTRACT

A remotely controlled hydrant system which may be quickly and efficiently connected to or disconnected from a hydrant to allow remote control of the hydrant by a remote controller such as a mobile phone. The remotely controlled hydrant system generally includes a frame which may be removably connected to a hydrant, such as a frost-free hydrant commonly used in agriculture. A pair of mount supports are removably secured against the shaft of the hydrant, such as via first and second connectors. An actuator is connected between the frame and the hydrant such that movement of the actuator in a first direction activates the hydrant and movement of the actuator in a second direction deactivates the hydrant. A control unit is adapted to receive activation or deactivation signals from a remote controller and direct operation of the actuator.

11 Claims, 14 Drawing Sheets

(56) References Cited

U.S. PATENT DOCUMENTS

2009/0001193 A1* 1/2009 Parsons .................. A01G 25/16
239/69
2013/0206241 A1* 8/2013 Fleury, Jr. .................. E03B 9/02
137/1

* cited by examiner

REMOTELY CONTROLLED HYDRANT SYSTEM

CROSS REFERENCE TO RELATED APPLICATIONS

I hereby claim benefit under Title 35, United States Code, Section 119(e) of U.S. provisional patent application Ser. No. 62/115,271 filed Feb. 12, 2015. The Ser. No. 62/115,271 application. The Ser. No. 62/115,271 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a remotely controlled hydrant system which may be quickly and efficiently connected to or disconnected from a hydrant to allow remote control of the hydrant by a remote controller such as a mobile phone.

Related Art

Any discussion of the related art throughout the specification should in no way be considered as an admission that such related art is widely known or forms part of common general knowledge in the field.

Hydrants are widely used throughout a variety of industries. For example, in the agricultural industry, acres of farmland may be irrigated via usage of such hydrants. In typical agricultural operations, rows of hydrants may be utilized to irrigate large swaths of land. Many miles of conduit with spread-out hydrants may be necessary in larger-scale operations.

In the past, one has been required to manually activate or deactivate hydrants. Given the great number of hydrants which can be utilized on large land, this can be an extremely arduous task. While remotely-controlled hydrants have been offered, such systems have typically required either the usage of specialized hydrant configurations which are not common on many farms, or the use of equipment which is both difficult to install and difficult to maintain.

SUMMARY

An example embodiment of the present invention is directed to a remotely controlled hydrant system. The remotely controlled hydrant system includes a frame which may be removably connected to a hydrant, such as a frost-free hydrant commonly used in agriculture. A pair of mount supports are removably secured against the shaft of the hydrant, such as via first and second connectors. An actuator is connected between the frame and the hydrant such that movement of the actuator in a first direction activates the hydrant and movement of the actuator in a second direction deactivates the hydrant. A control unit is adapted to receive activation or deactivation signals from a remote controller and direct operation of the actuator. Through use of a bracket and pin, the actuator may be quickly and easily disconnected from the hydrant to allow manual operation when needed.

There has thus been outlined, rather broadly, some of the features of the remotely controlled hydrant system in order that the detailed description thereof may be better understood, and in order that the present contribution to the art may be better appreciated. There are additional features of the remotely controlled hydrant system that will be described hereinafter and that will form the subject matter of the claims appended hereto. In this respect, before explaining at least one embodiment of the remotely controlled hydrant system in detail, it is to be understood that the remotely controlled hydrant system is not limited in its application to the details of construction or to the arrangements of the components set forth in the following description or illustrated in the drawings. The remotely controlled hydrant system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
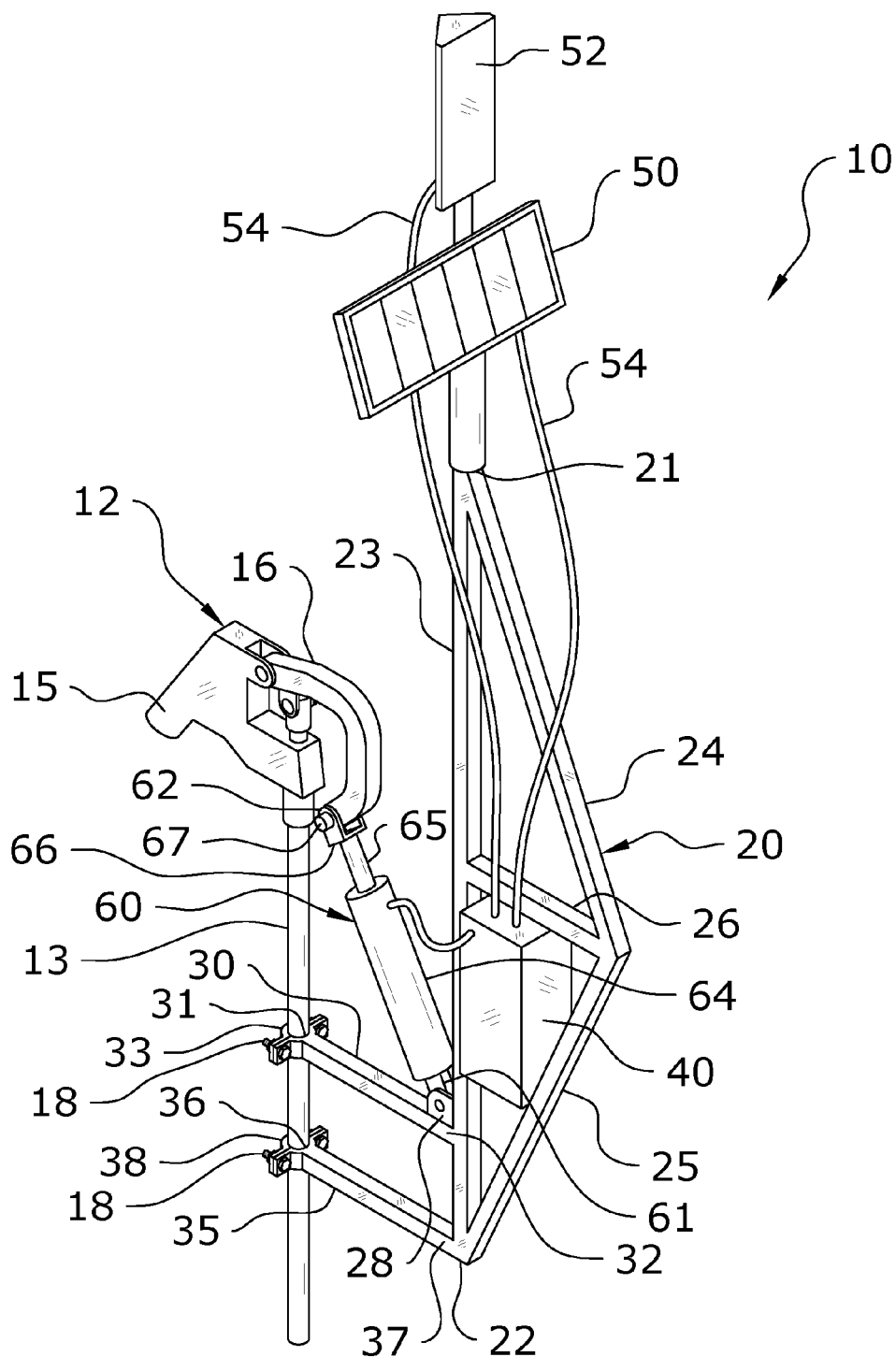
FIG. 1 is a perspective view of a remotely controlled hydrant system in accordance with a first example embodiment.

An example remotely controlled hydrant system generally comprises a frame 20 which may be removably connected to a hydrant 12, such as a frost-free hydrant 12 commonly used in agriculture. A pair of mount supports 30, 35 are removably secured against the shaft 13 of the hydrant 12, such as via first and second connectors 33, 38. An actuator 60 is connected between the frame 20 and the hydrant 12 such that movement of the actuator 60 in a first direction activates the hydrant 12 and movement of the actuator 60 in a second direction deactivates the hydrant 12. A control unit 40 is adapted to receive activation or deactivation signals from a remote controller 46 and direct operation of the actuator 60. Through use of a bracket 66 and pin 67, the actuator 60 may be quickly and easily disconnected from the hydrant 12 to allow manual operation when needed.

B. Frame

FIGS. 1 through 4 illustrate an exemplary embodiment of a frame 20 which is adapted to be connected to a hydrant 12. In a preferred embodiment, the frame 20 is adapted to be quickly and efficiently connected to or disconnected from the hydrant 12. The frame 20 generally comprises an upper end 21 and a lower end 22. While the figures illustrate that the lower end 22 of the frame 20 is connected to the hydrant 12, it should be appreciated that various other locations along the frame 20 may be connected to various locations on a hydrant 12 in various embodiments.

In an exemplary embodiment shown in FIGS. 1-4, the frame 20 comprises a main support 23 from which extends a pair of mount supports 30, 35 which are utilized to removably connect the main support 23 and the rest of the frame 20 with the hydrant 12. The main support 23 may extend vertically with the mount supports 30, 35 extending horizontally therefrom at a right angle, or other configurations may be utilized. It should be appreciated that the number of mount supports 30, 35 and the configuration of the frame 20 described herein is merely exemplary, and should not be construed as limiting on the scope of the present invention.

As shown in FIGS. 1-4, the main support 23 may be reinforced with additional supports 24, 25, 26 to accommodate the weight of attached equipment such as the control unit 40, solar panel 50, antenna 52, actuator 60, and the like. In an exemplary embodiment shown in the figures, the reinforcement structure comprises a first diagonal support 24 connected near an upper end of the main support 23 and a second diagonal support 25 connected between a lower end of the main support 23 and the first diagonal support 24 to form a triangular structure as shown in FIG. 1. A cross support 26 may also extend between the main support 23 and a junction between the first and second diagonal supports 24, 25; both to provide additional reinforcement and to provide a potential mounting point for the control unit 40.

Figure 4:
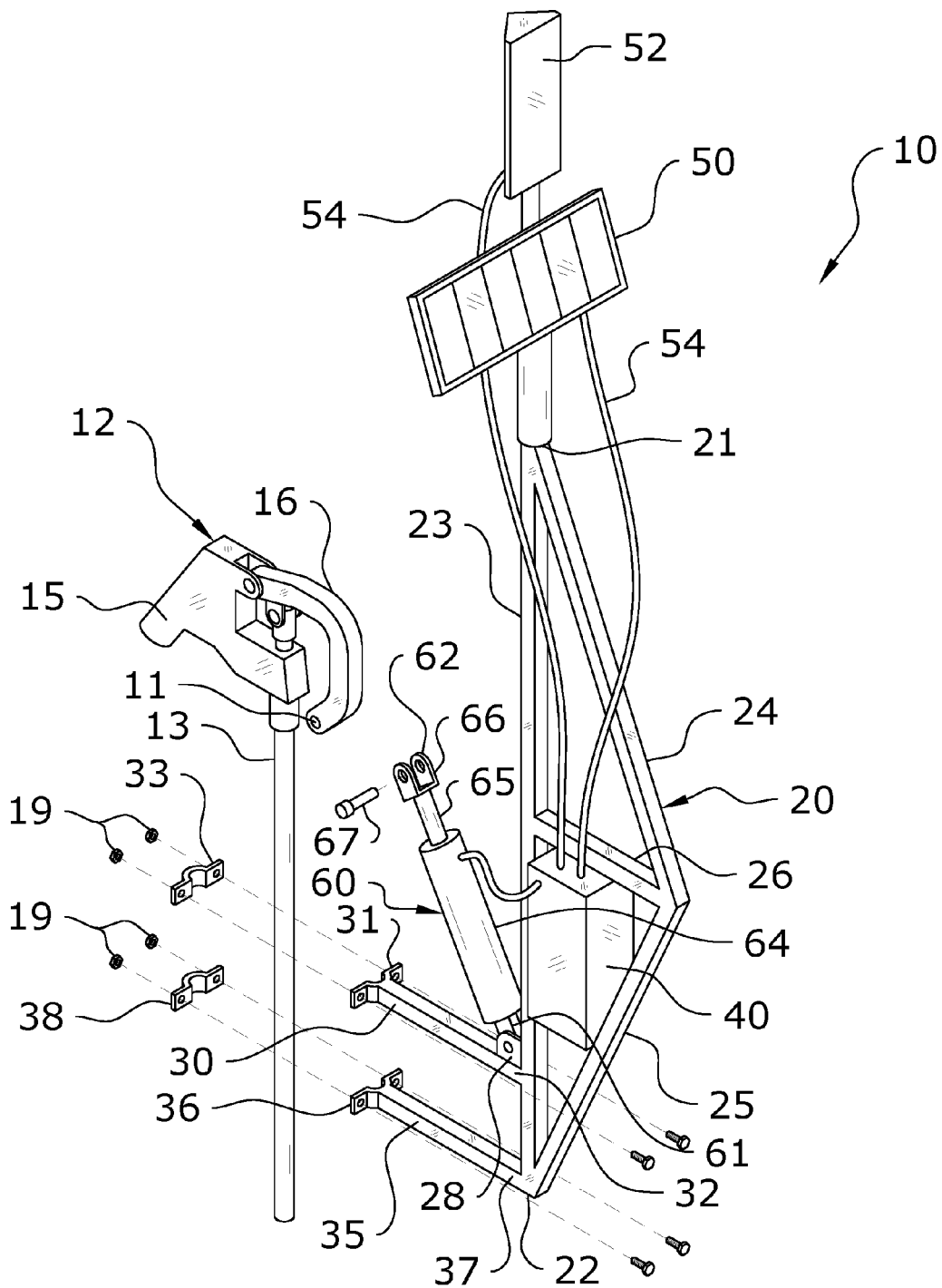
FIG. 4 is a perspective view of a remotely controlled hydrant system disconnected from a hydrant in accordance with a first example embodiment.

As best shown in FIG. 4, a first mount support 30 and a second mount support 35 extend outwardly from the main support 23 at or near the lower end 22 of the frame 20. It should be appreciated that, in some embodiments, only one mount support 30 may be necessary to firmly connect the frame 20 to a hydrant 12. The number of mount supports 30, 35 shown and described herein should not be construed as limiting.

As shown in FIG. 4, the first end 31 of the first mount support 30 includes a first connector 33 and the first end 36 of the second mount support 35 includes a second connector 38. The first and second connectors 33, 38 are adapted to quickly connect to or disconnect from a hydrant 12, such as via its outer shaft 13. In the figures, the connectors 33, 38 are shown as being comprised of brackets which connect around the hydrant 12 and are secured to the mount supports 30, 35 via fasteners 18 and nuts 19. Other configurations, such as a splint-ring or various other bracket configurations, could be utilized to removably connect the mount supports 30, 35 with the hydrant 12.

C. Control Unit

Figure 5:
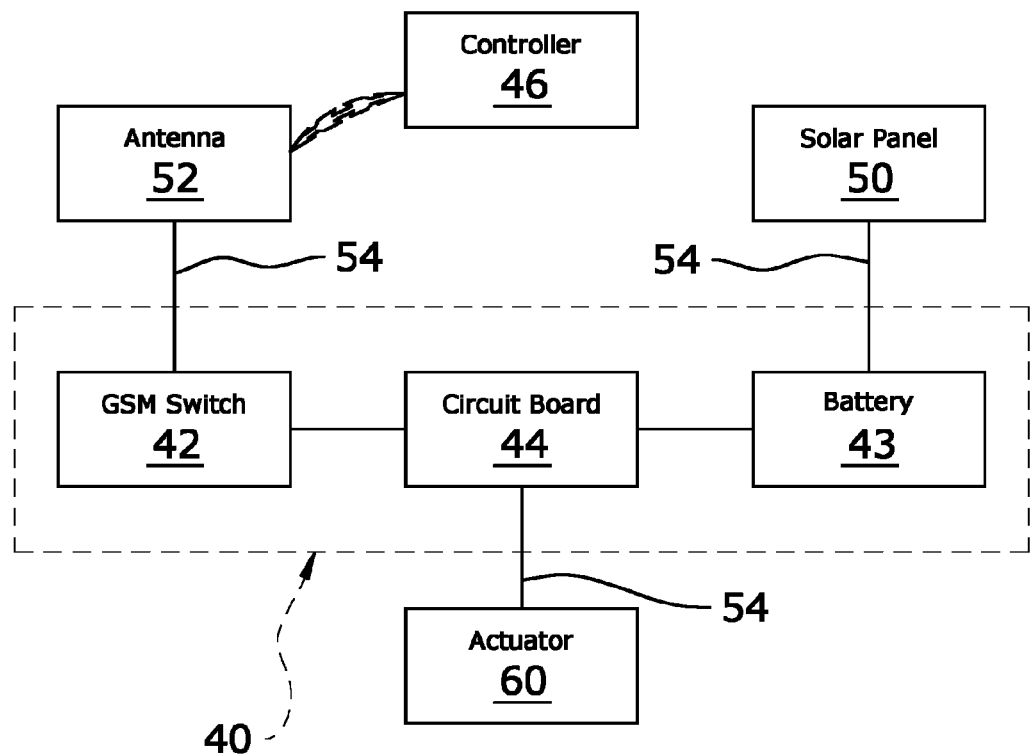
FIG. 5 is a block diagram of the control unit and its interconnection with the antenna, solar panel, and actuator.

As best shown in FIG. 5, a control unit 40 may be provided to receive signals from a remote controller 46 such as a mobile phone and to control operation of the actuator 60 to activating or deactivating the hydrant 12. The control unit 40 may include an outer casing to protect it from the surrounding environs as shown in FIGS. 1-4. The control unit 40 may be connected to the frame 20 at various locations thereon, and thus the positioning of the control unit 40 on the frame 20 shown in the exemplary figures should not be construed as limiting.

In the exemplary embodiment shown in FIG. 5, the control unit 40 comprises a switch 42, a battery 43, and a circuit board 44. The switch 42 is utilized to direct operation of the actuator 60, which may be connected to the control unit 40 remotely or via cords 54 as shown in FIGS. 1-4. In a preferred embodiment, the switch 42 may comprise a GSM switch 42, which is configured to utilize the common GSM cellular phone networks prevalent throughout the world. However, other types of switches 42 based on other communications protocols may be utilized in different embodiments.

The circuit board 44 may comprise integrated circuitry comprising circuitry adapted to perform the various functions of the present invention. The circuit board 44 may act as an interface between the actuator 60, the switch 42, the battery 43, the antenna 52, and/or the solar panel 50 in different embodiments. In some embodiments, a discrete circuit board 44 may not be necessary, with the switch 42, battery 43, and actuator 60 being directly connected to each other. In some embodiments, the frame 20 may include an attached camera; with the camera's images or videos being transmitted via the control unit 40 to a remote location to be viewed.

The battery 43 may be utilized to provide primary or back-up power to the actuator 60, depending on the type of actuator 60 used. Various types of batteries 43 may be utilized. Preferably, the battery 43 will comprise a battery-type which is efficient, long-lasting, and rechargeable via a solar panel 50 connected to the frame 20. The solar panel 50 may be utilized to provide charge to the battery 43, or to provide direct charge to the actuator 60 in some embodiments. The type, size, placement, and configuration of the solar panel 50 may vary in different embodiments and should not be construed as limited by the exemplary embodiment shown in the figures.

As shown in FIGS. 1-5, an antenna 52 may also be provided to provide remote communication with the controller 46. In some embodiments such as the exemplary embodiment shown in the figures, the antenna 52 may be connected to or extent from the frame 20. The antenna 52 may be connected to the switch 42 directly as shown in FIG. 5 or may be indirectly connected to the switch 42, such as via a circuit board 44, in other embodiments. The switch 42 may, in some embodiments, include its own antenna 52. The type, size, placement, and configuration of the antenna 52 may vary in different embodiments and should not be construed as limited by the exemplary embodiment shown in the figures.

D. Actuator

As shown in FIGS. 1-4, an actuator 60 may be utilized to lift or lower the handle 16 of the hydrant 12, thus activating or deactivating the hydrant 12. The actuator 60 will generally extend to lift the handle 16 of the hydrant 12 to activate the hydrant 12 and retract to lower the handle 16 of the hydrant 12 to deactivate the hydrant 12. Various types of actuators 60 may be utilized, including but not limited to the electric actuator 60 shown in the figures. The actuator 60 may be diagonally oriented between the frame 20 and the handle 16 of the hydrant 12, or may be otherwise oriented. In some embodiments, a separate cover or casing may be provided to partially or fully enclose the actuator 60.

The actuator 60 will generally be connected between the frame 20 and the hydrant 12 such that movement of the actuator 60 in a first direction activates the hydrant 12 and movement of the actuator 60 in a second direction deactivates the hydrant 12. Generally, the first end 61 of the actuator 60 is connected to the frame 20 while the second end 62 of the actuator 60 is connected to the hydrant 12. The figures illustrate that extension of the actuator 60 activates the hydrant 12 and retraction of the actuator 60 deactivates the hydrant; it should be appreciated that the reverse configuration could be utilized in some embodiments. The direction of movement of the actuator 60 to turn on or turn off the hydrant 12 should not be limited by the exemplary embodiment of the figures.

Figure 2:
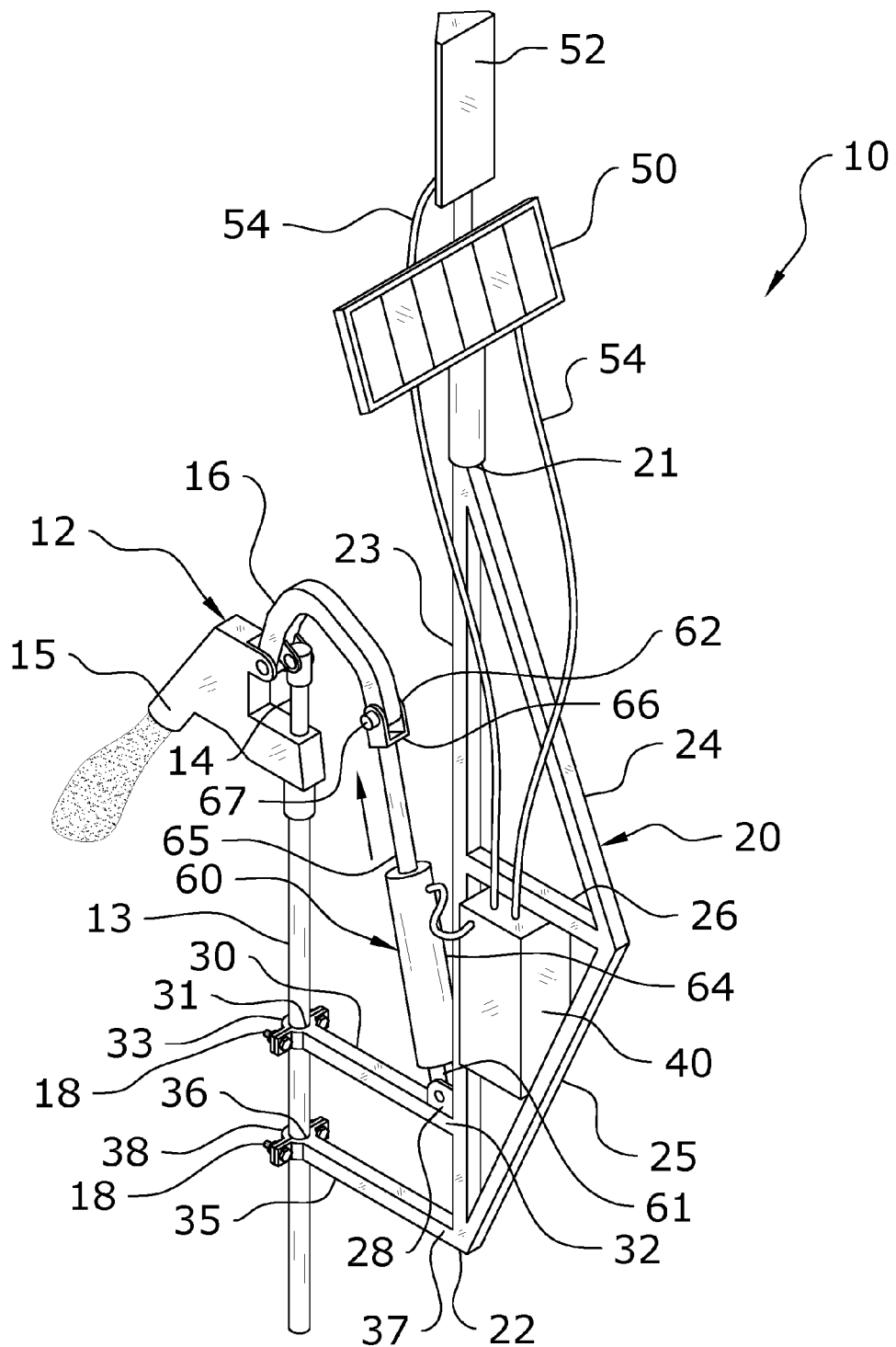
FIG. 2 is a perspective view of a remotely controlled hydrant system activating a hydrant in accordance with a first example embodiment.
Figure 3:
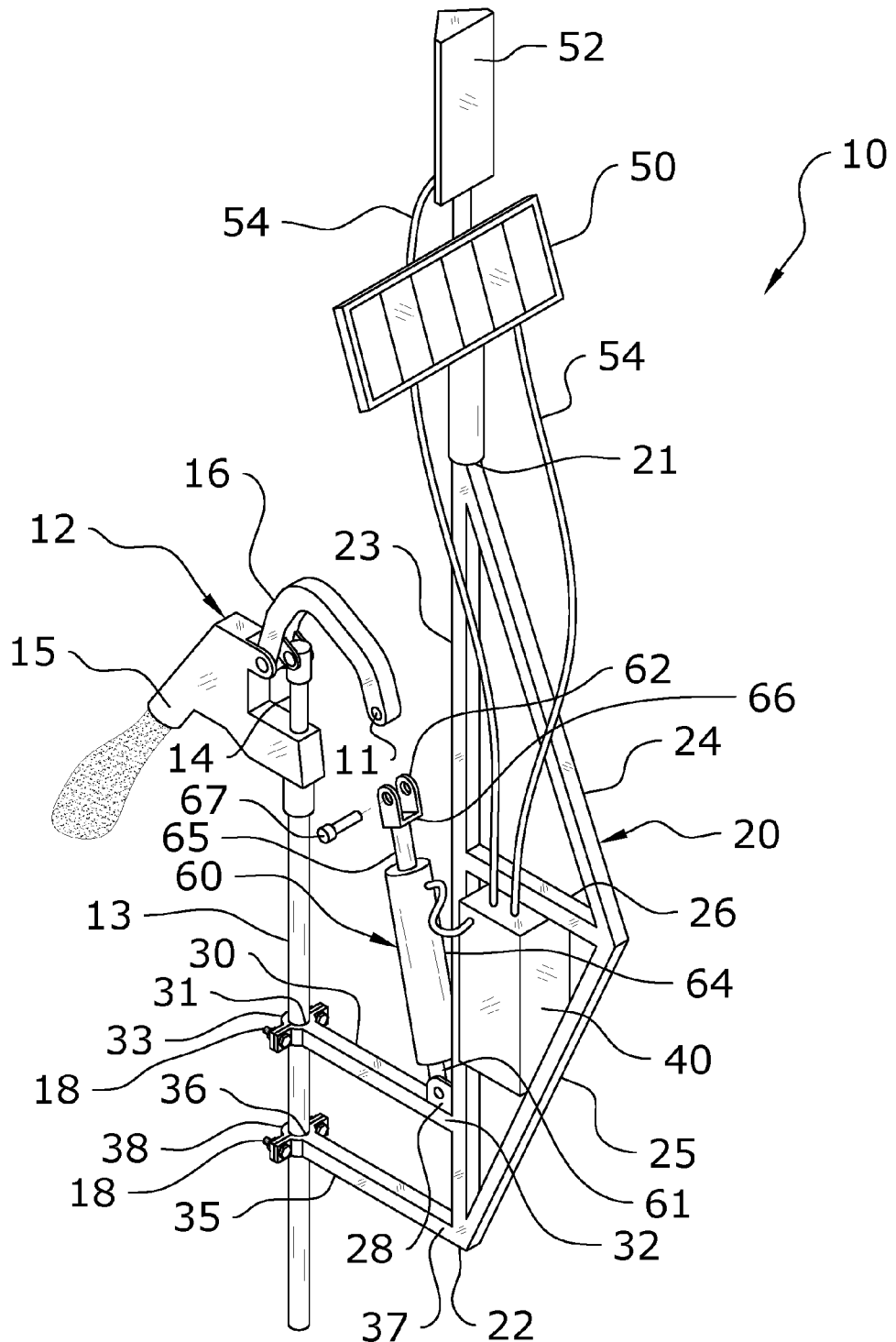
FIG. 3 is a perspective view of a remotely controlled hydrant system disconnected from a hydrant handle in accordance with a first example embodiment.

In a preferred embodiment as shown in FIGS. 1-4, the actuator 60 comprises a base 64 and a shaft 65 which movably extends into and out of the base 64. The base 64 of the actuator 60 is preferably connected to the frame 20 and the shaft 65 is preferably connected to the hydrant 12, such as the handle 16 of the hydrant 12 as shown in FIGS. 1-2. It should be appreciated that, in some embodiments, the base 64 may be connected to the hydrant 12 and the shaft 65 connected to the frame 20.

The actuator 60 will preferably be easily and quickly removable from connection with the hydrant 12. This feature ensures that the hydrant 12 may be operated in the event of actuator 60 failure, such as loss of power or communications with the controller 46. In the embodiment shown in the figures, the shaft 65 of the actuator 60 includes a bracket 66 which is adapted to removably receive a pin 67. The pin 67 may be extended through both the bracket 66 and an opening 11 on the handle 16 of the hydrant 12 to quickly and easily connect the actuator 60 to the hydrant 12. By removing the pin 67 from the bracket 66, the actuator 60 may be easily disconnected from the hydrant 12 so that the hydrant 12 may be operated as normal.

E. Operation of Preferred Embodiment

Figure 6:
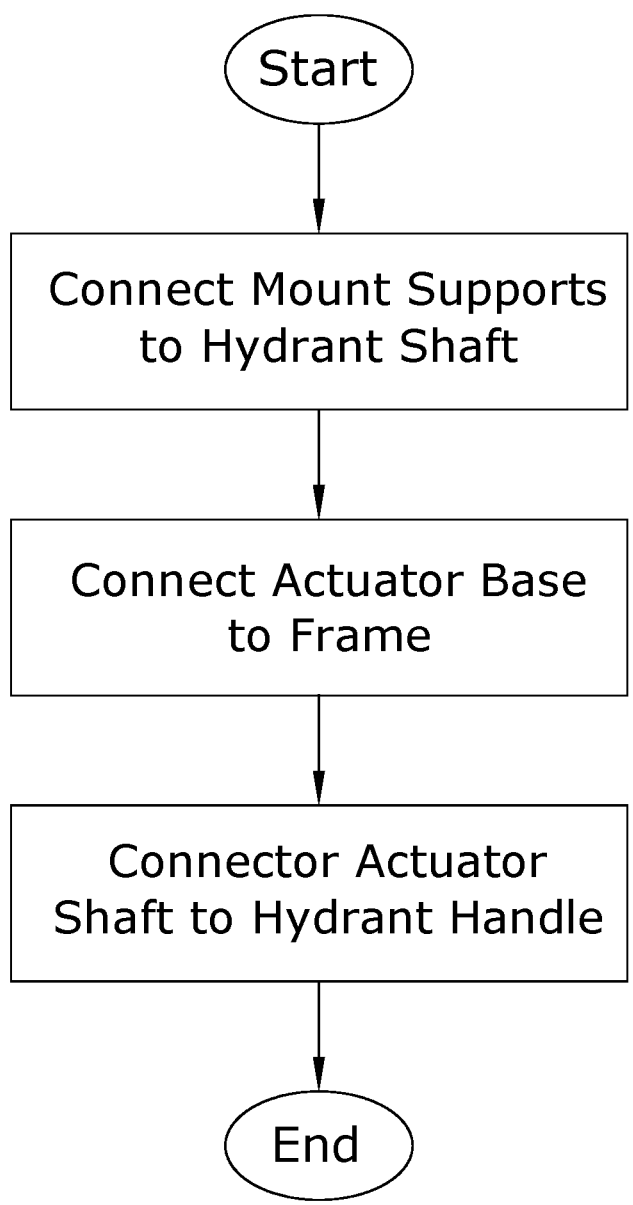
FIG. 6 is a flow chart illustrating installation of a first example embodiment to a hydrant.

In use, the frame 20 is first connected to the hydrant 12. FIG. 6 illustrates an exemplary method of connecting the present invention to a hydrant 12, though other steps or order of steps could be utilized in alternate embodiments. In the preferred embodiment shown, the mount supports 30, 35 are first connected to the outer shaft 13 of the hydrant 12.

As best shown in FIG. 4, the mount supports 30, 35 may be connected to the outer shaft 13 by positioning the mount supports 30, 35 against the outer shaft 13 and then securing the first connector 33 around the outer shaft 13 to be connected to the first mount support 30 and securing the second connector 38 around the outer shaft 13 to be connected to the second mount support 35. With the frame 20 connected to the hydrant 12 via the mount supports 30, 35, the actuator 60 may be connected.

The actuator 60 is installed by connecting the actuator's 60 base 64 to the frame 20 as shown in FIGS. 1-4. Preferably, the actuator's 60 base 64 is pivotally connected to the frame 20 so that the actuator 60 may pivot about its base 64 when the shaft 65 is not engaged with the hydrant 12. With the base 64 so attached to the frame 20, the shaft 65 of the actuator 60 may be connected to the hydrant 12.

Preferably, the shaft 65 of the actuator 60 is connected to a portion of the hydrant 12 which may be lifted or lowered to activate or deactivate the hydrant 12, such as its handle 16. Most handles 16 used on hydrant's 12 have at least one opening 11 to which the shaft 65 of the actuator 60 may be connected, such as with a bracket 66 and pin 67. In the event such an opening 11 is not available, the shaft 65 may be connected by other means such as various clasps, brackets, or fasteners. Alternatively, an opening 11 could be created in the hydrant 12 suited particularly for receiving the shaft 65 of the actuator 60.

With the frame 20 and actuator 60 connected to the hydrant 12, the invention is ready for use. A controller 46 may be utilized to activate or deactivate the hydrant 12 through control of the actuator 60. The controller 46 may comprise any type of device capable of remotely communicating with the control unit 40 of the present invention, such as but not limited to a computer, a laptop, a tablet, a mobile phone, or the like.

The controller 46 may be set up with a timer to allow automatic activation/deactivation of the hydrant 12. Some embodiments of the present invention may be activated or deactivated through SMS messages received from the controller 46. The controller 46 may in some embodiments run specialized software programs for operating various embodiments of the present invention. Such a specialized software program may provide additional functionality, such as monitoring of water level, flow rates, battery charge, and the like.

Figure 7:
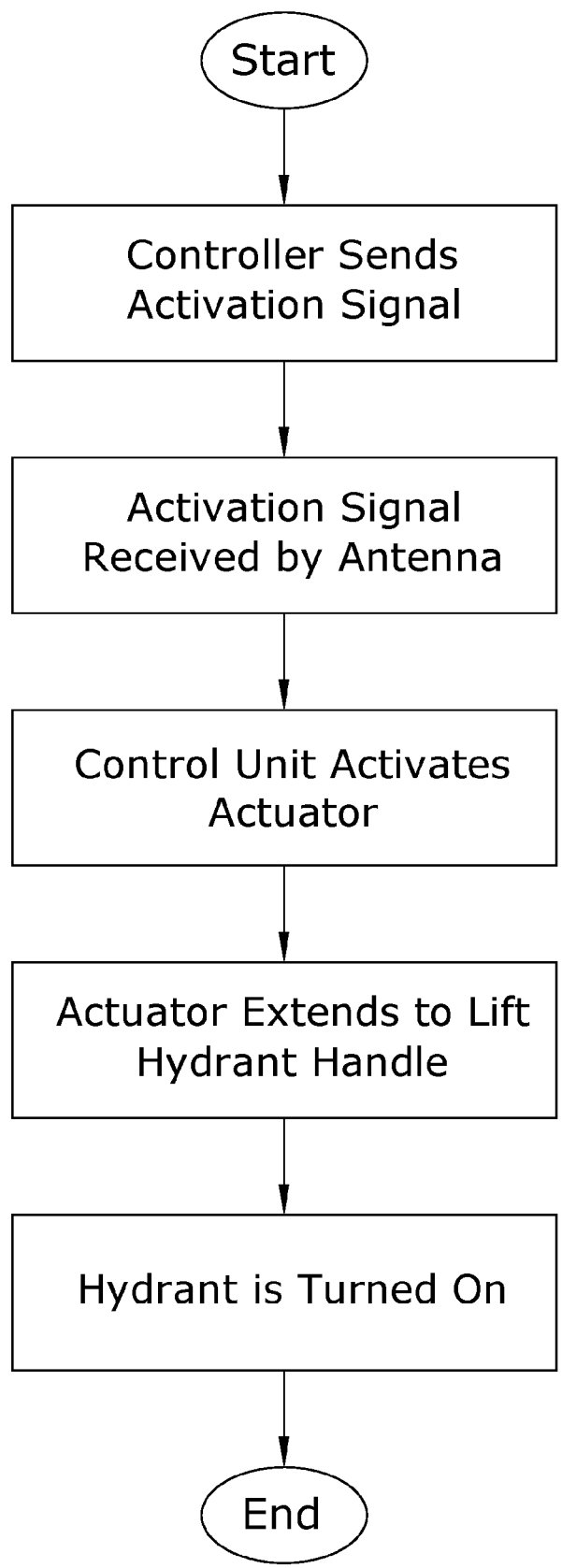
FIG. 7 is a flow chart illustrating activation of the hydrant in a first example embodiment.

FIG. 7 is an exemplary flowchart illustrating one exemplary method for activating the hydrant 12 remotely. Using the controller 46, the operator may press a button or perform another task which instructs the controller 46 to send an activation signal to the present invention. This activation signal will generally be received by the antenna 52. Upon receipt of the activation signal, the control unit 40 will direct power to the actuator 60 so that the actuator 60 extends. Extension of the actuator 60 will lift the handle 16 of the hydrant 12, which will cause the hydrant 12 to activate and dispense its fluids.

Figure 8:
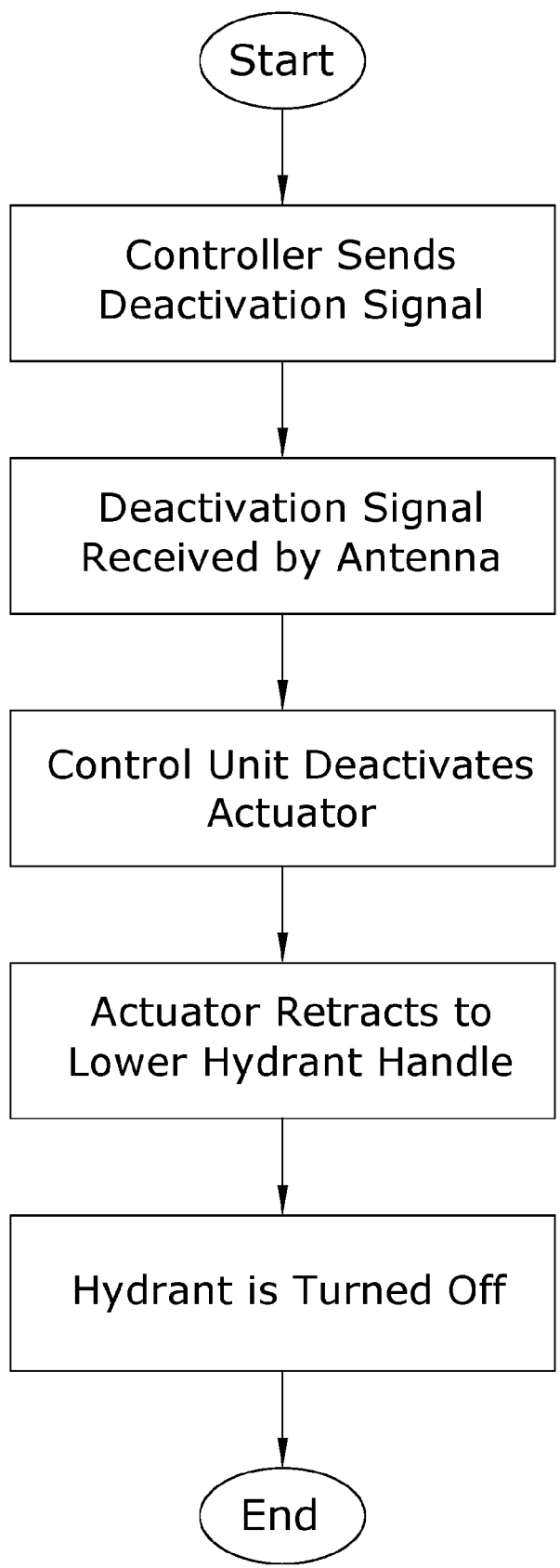
FIG. 8 is a flow chart illustrating deactivation of the hydrant in a first example embodiment.
Figure 9:
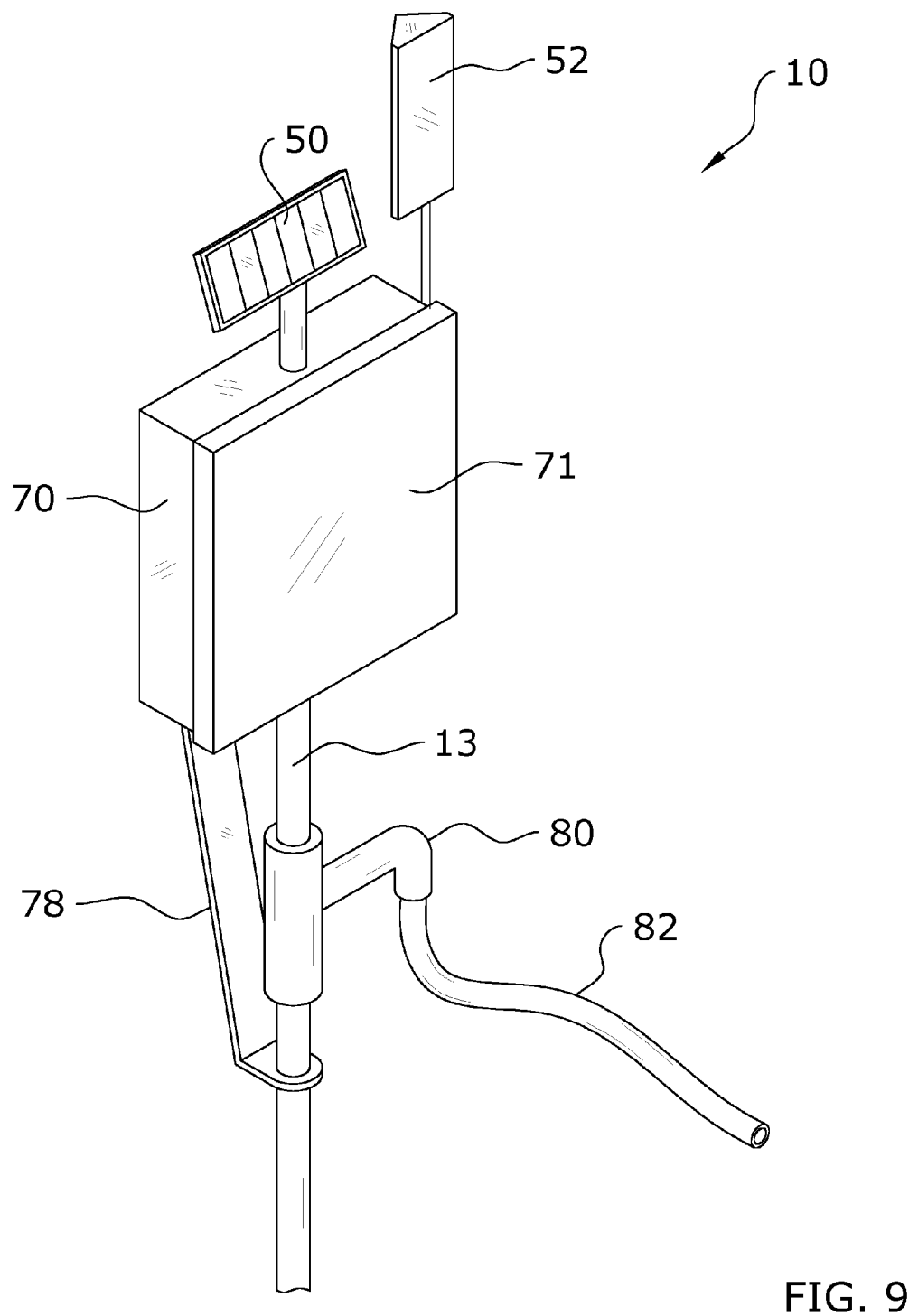
FIG. 9 is a perspective view of a remotely controlled hydrant system in accordance with a second example embodiment.
Figure 10:
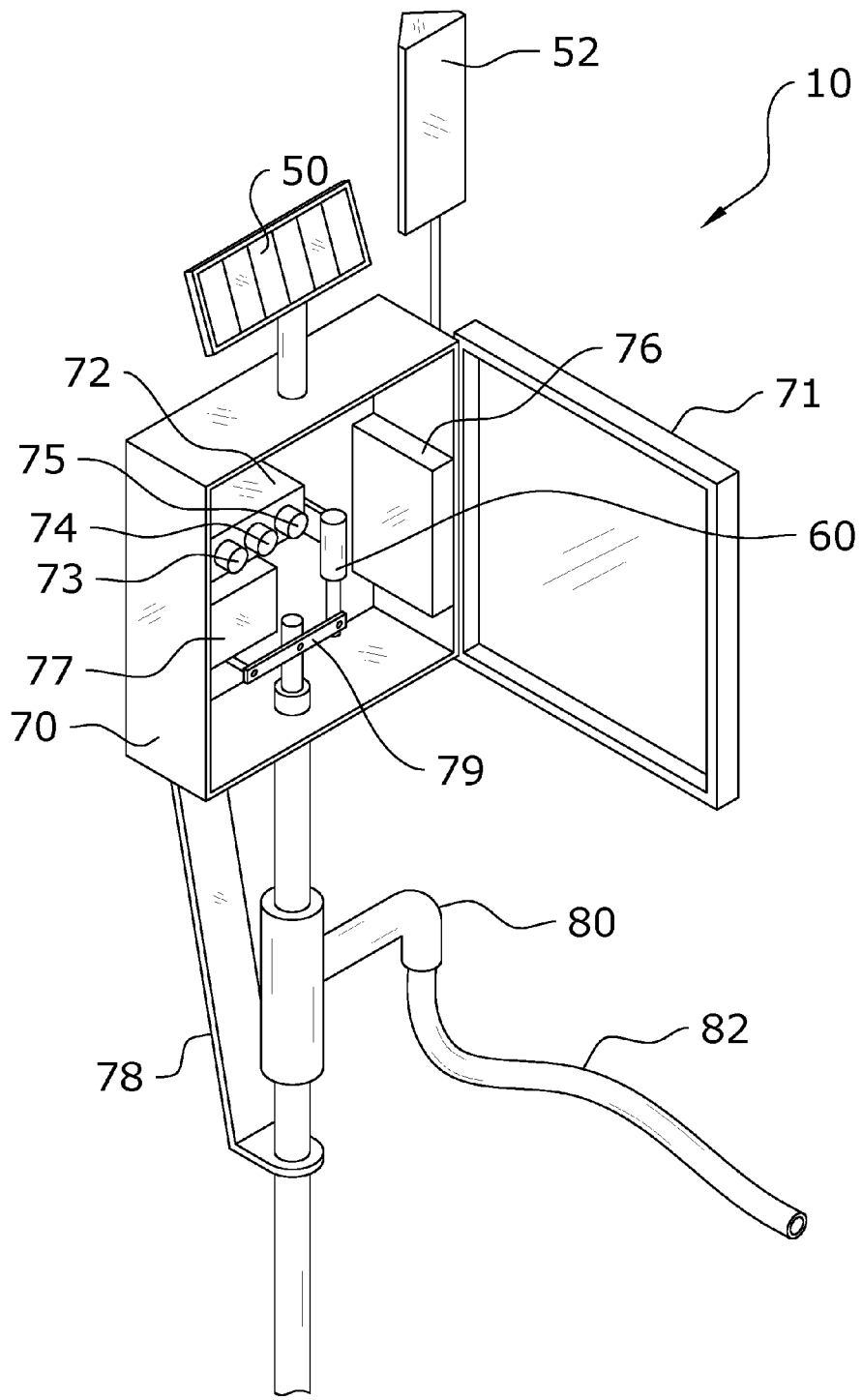
FIG. 10 is a perspective view of a remotely controlled hydrant system with the housing cover open in accordance with a second example embodiment.
Figure 11:
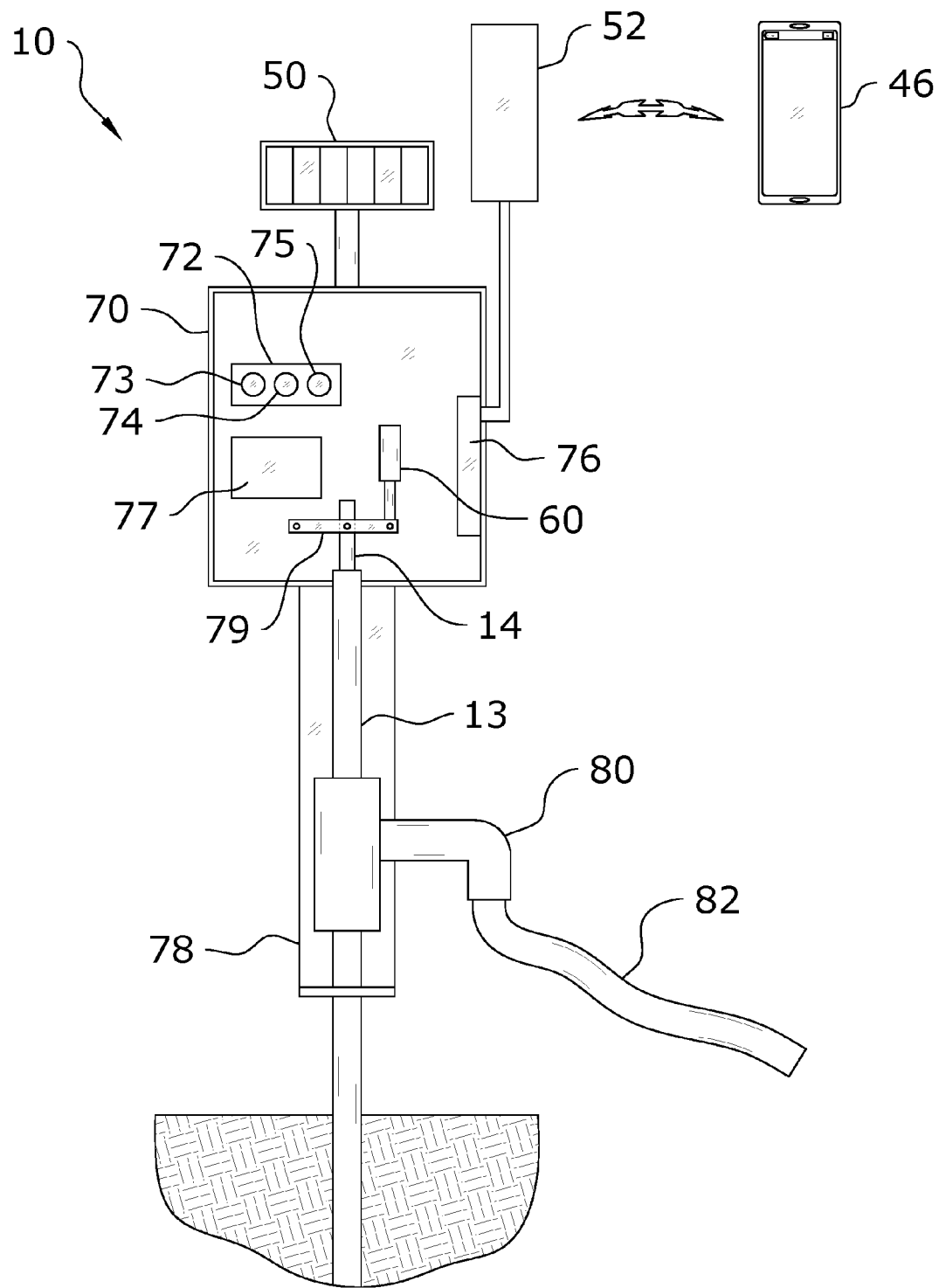
FIG. 11 is a frontal view of a remotely controlled hydrant system in accordance with a second example embodiment.
Figure 12:
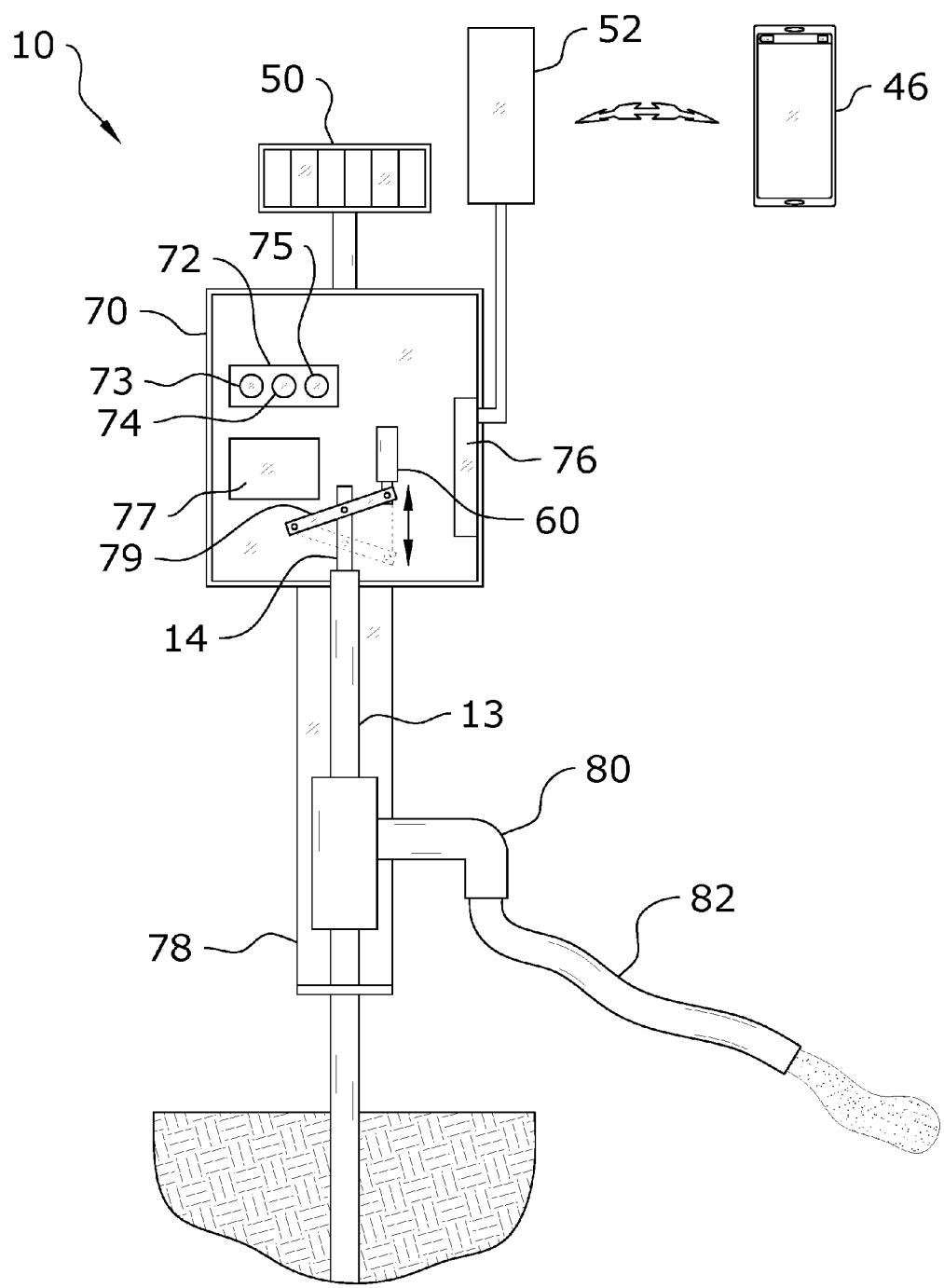
FIG. 12 is a frontal view of a remotely controlled hydrant system with the hydrant activated in accordance with a second example embodiment.
Figure 13:
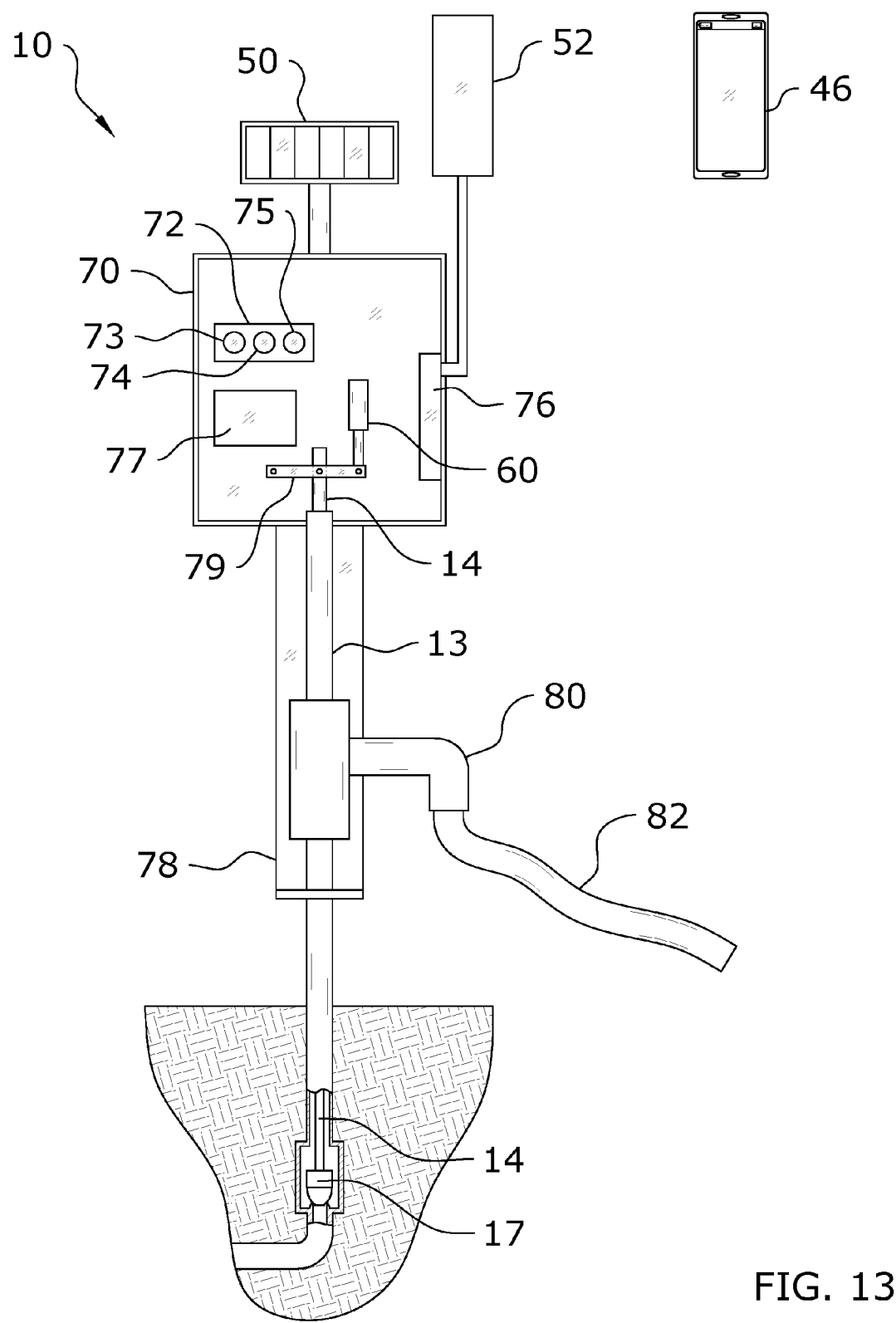
FIG. 13 is a front sectional view of a remotely controlled hydrant system with the hydrant deactivated in accordance with a second example embodiment.
Figure 14:
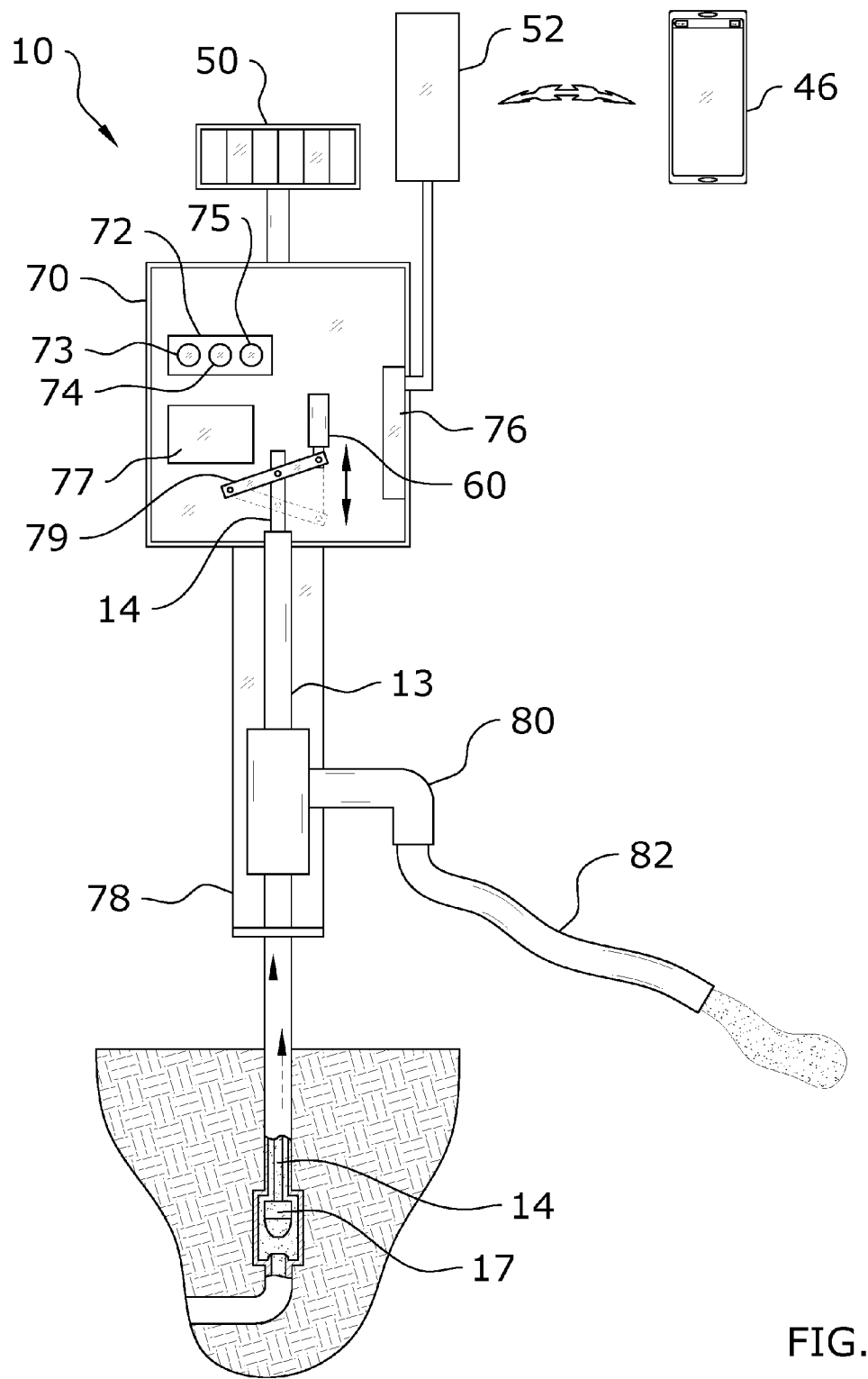
FIG. 14 is a front sectional view of a remotely controlled hydrant system with the hydrant activated in accordance with a second example embodiment.

FIG. 8 is an exemplary flowchart illustrating one exemplary method for deactivating the hydrant 12 remotely. Using the controller 46, the operator may press a button or perform another task which instructs the controller 46 to send a deactivation signal to the present invention. This deactivation signal will generally be received by the antenna 52. Upon receipt of the deactivation signal, the control unit 40 will direct power to the actuator 60 so that the actuator 60 retracts. Retraction of the actuator 60 will lower the handle 16 of the hydrant 12, which will cause the hydrant 12 to deactivate and stop dispensing fluids.

It should be noted that the controller 46 or control unit 40 could be set on a timer, such that the hydrant 12 automatically activates or deactivates at certain times or under certain conditions. In the event of failure of any components of the present invention, the actuator 60 is adapted to be easily and quickly removed from the hydrant 12. One would simply remove the pin 67 from the bracket 66, which will allow the shaft 65 of the actuator 60 to disconnect and fall away from the hydrant 12. The hydrant 12 may then be operated manually until the present invention is functional again, at which time the actuator 60 may be easily reconnected.

F. Alternate Embodiment

An alternate embodiment of the present invention is shown in FIGS. 9-14. This embodiment utilizes a housing 70 which surrounds the control unit 77 and the actuator 60. The housing 70 may be attached to the hydrant 12 via a mounting bracket 78 of various configurations; an exemplary configuration being shown in FIGS. 9-10. A cover 71 may be connected to the housing 70 so that the housing 70 may be opened for access and use and closed for protection of its internal components when not being accessed or used.

In this alternate embodiment, the hydrant head 15 is removed so that the inner shaft 14 of the hydrant 12 is exposed. The inner shaft 14 extends into the housing 70, where it is connected via a linkage 79 to the actuator 60. A control unit 72, receiver 76, and battery 77 are positioned within the housing 70. The receiver 76 is connected to an antenna 52 for receiving signals from the controller 46. The battery 77 may be connected to a solar panel 50 for charging purposes.

The control unit 72 of this alternate embodiment may include a power button 73, manual override 74, and amp breaker 75. The power button 73 allows the invention to be deactivated during long periods of non-use. The manual override 74 is provided to shut down the control unit 72 or actuator 60 in emergency situations. The amp breaker 75 protects against power strikes and the like.

A separate outlet 80 and hose 82 may be provided with this alternate embodiment as shown in FIGS. 9-14. The outlet 80 may extend from the hydrant's 12 outer shaft 13 to dispense fluids therefrom. In use, activation of the actuator 60 will draw the inner shaft 14 of the hydrant 12 upwardly, thus releasing the plunger 17 and allowing fluids to flow. Deactivation of the actuator 60 will push the inner shaft 14 of the hydrant 12 downwardly, re-engaging the plunger 17 and stopping fluid flow.

Unless otherwise defined, all technical and scientific terms used herein have the same meaning as commonly understood by one of ordinary skill in the art to which this invention belongs. Although methods and materials similar to or equivalent to those described herein can be used in the practice or testing of the remotely controlled hydrant system, suitable methods and materials are described above. All publications, patent applications, patents, and other references mentioned herein are incorporated by reference in their entirety to the extent allowed by applicable law and regulations. The remotely controlled hydrant system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A remotely controlled hydrant system, comprising:
a frame adapted to be connected to a hydrant;
an actuator adapted to be connected between the frame and a handle of the hydrant; and
a controller communicatively interconnected with the actuator to remotely extend or retract the actuator, wherein extension of the actuator moves the handle of the hydrant in a first direction to activate the hydrant, wherein retraction of the actuator moves the handle of the hydrant in a second direction to deactivate the hydrant, wherein the frame comprises a main support, a first diagonal support connected to an upper end of the main support, and a second diagonal support connected between a lower end of the main support and the first diagonal support.

2. The remotely controlled hydrant system of claim 1, wherein the actuator comprises a base and a shaft, wherein the base is connected to the frame and wherein the shaft is connected to the handle of the hydrant.

3. The remotely controlled hydrant system of claim 2, wherein the shaft is removably connected to the handle of the hydrant.

4. The remotely controlled hydrant system of claim 2, wherein the shaft of the actuator includes a bracket and further comprising a pin adapted to removably extend through the bracket and an opening in the handle of the hydrant to removably connect the actuator with the hydrant.

5. The remotely controlled hydrant system of claim 1, wherein the actuator is diagonally oriented between the frame and the handle of the hydrant.

6. The remotely controlled hydrant system of claim 1, wherein the frame comprises a main support and a mount support connected to the main support.

7. The remotely controlled hydrant system of claim 6, wherein the mount support is removably connected to the hydrant.

8. The remotely controlled hydrant system of claim 7, wherein the main support extends vertically, wherein the mount support extends horizontally.

9. The remotely controlled hydrant system of claim 7, wherein the actuator comprises a base and a shaft, wherein the base of the actuator is connected to the mount support.

10. The remotely controlled hydrant system of claim 9, wherein the frame further comprises a cross support extending between the main support and a junction between the first diagonal support and the second diagonal support.

11. A remotely controlled hydrant system, comprising:
a hydrant comprising a shaft and a handle for activating or deactivating the hydrant;
a frame adapted to be removably connected to a hydrant, wherein the frame comprises:
a vertical base support including an upper end and a lower end;
a first mount support extending horizontally from the lower end of the vertical base support, wherein the first mount support is removably connected to the shaft of the hydrant;
a second mount support extending horizontally from near the lower end of the vertical base support, wherein the second mount support is removably connected to the shaft of the hydrant;
an actuator adapted to be connected between the frame and a handle of the hydrant, wherein the actuator comprises a base connected to the frame and a shaft removably connected to the handle of the hydrant;
a control unit connected to the actuator, wherein the control unit is adapted to extend or retract the actuator, wherein the control unit includes a battery and a GSM switch;
an antenna connected to the frame, wherein the antenna is connected to the control unit;
a solar panel connected to the frame, wherein the solar cell is connected to the battery; and
a controller communicatively interconnected with the control unit to remotely extend or retract the actuator, wherein extension of the actuator lifts the handle of the hydrant to activate the hydrant, wherein retraction of the actuator lowers the handle of the hydrant to deactivate the hydrant.

\* \* \* \* \*